(12) United States Patent
Ganesan et al.

(10) Patent No.: US 7,334,128 B2
(45) Date of Patent: *Feb. 19, 2008

(54) ACCESSING INFORMATION ON A NETWORK USING AN EXTENDED NETWORK UNIVERSAL RESOURCE LOCATOR

(75) Inventors: Ravi Ganesan, Half Moon Bay, CA (US); Kenneth Hobday, Blacklick, OH (US); Matt Lewis, Atlanta, GA (US)

(73) Assignee: CheckFree Corporation, Norcross, GA (US)

( * ) Notice: Subject to any disclaimer, the term of this patent is extended or adjusted under 35 U.S.C. 154(b) by 287 days.

This patent is subject to a terminal disclaimer.

(21) Appl. No.: 11/139,512

(22) Filed: May 31, 2005

(65) Prior Publication Data

US 2005/0222953 A1    Oct. 6, 2005

Related U.S. Application Data

(63) Continuation of application No. 09/471,490, filed on Dec. 23, 1999, now Pat. No. 6,948,063.

(51) Int. Cl.
*H04L 9/32* (2006.01)
*G06Q 40/00* (2006.01)
*G06F 15/16* (2006.01)
*H04L 9/00* (2006.01)

(52) U.S. Cl. .................. 713/168; 713/193; 705/40; 705/53; 705/77; 709/217

(58) Field of Classification Search ................ 713/168, 713/193; 705/40, 53, 77; 709/217
See application file for complete search history.

(56) References Cited

U.S. PATENT DOCUMENTS 5,444,780 A * 8/1995 Hartman, Jr. ................ 380/30

(Continued)

OTHER PUBLICATIONS

Open Financial Exchange Specification 1.5.1, Nov. 23, 1998, pp. 61, 452-453.

(Continued)

*Primary Examiner*—Minh D. Nguyen
(74) *Attorney, Agent, or Firm*—Sutherland Asbill & Brennan LLP

(57) ABSTRACT

To facilitate access to information on a network, an extended network universal resource locator is generated. The generated extended network universal resource locator has (i) a network address, such as an Internet URL, at which stored information, such as detailed bill information, can be accessed on a network, (ii) identity information associated with a first network entity and an integrity value corresponding to the identity information, and (iii) voucher information indicating that a third network entity has authenticated the first network entity and that transmission of the extended network universal resource locator by the third network entity to the first network entity occurred at a particular time. The identity information could, for example, include an identification of the stored information and an account number associated with the first network entity. The integrity value could, for example, be a hash of the identity information. The identity information and the integrity value are encrypted with a first crypto-key of a second network entity. The voucher information is encrypted with a second crypto-key of the third network entity. The transmission time information is preferably a timestamp. The extended network universal resource locator is transmitted via the network to facilitate access, by the first entity, to the information stored at the network address.

12 Claims, 11 Drawing Sheets

U.S. PATENT DOCUMENTS

| | | | |
|---|---|---|---|
| 5,727,065 A * | 3/1998 | Dillon | 705/52 |
| 5,737,414 A | 4/1998 | Walker et al. | |
| 5,809,144 A | 9/1998 | Sirbu et al. | |
| 5,815,665 A | 9/1998 | Teper et al. | |
| 5,987,140 A | 11/1999 | Rowney et al. | |
| 6,049,786 A | 4/2000 | Smorodinsky | |
| 6,275,934 B1 * | 8/2001 | Novicov et al. | 713/168 |
| 6,285,991 B1 | 9/2001 | Powar | |
| 6,292,789 B1 | 9/2001 | Schutzer | |
| 6,530,025 B1 * | 3/2003 | Nakagawa et al. | 726/4 |
| 6,557,102 B1 * | 4/2003 | Wong et al. | 713/176 |
| 6,560,581 B1 | 5/2003 | Fox et al. | |
| 6,751,733 B1 * | 6/2004 | Nakamura et al. | 713/182 |
| 2001/0001147 A1 * | 5/2001 | Hutchison et al. | 705/26 |
| 2002/0016765 A1 | 2/2002 | Sacks | |

OTHER PUBLICATIONS

Open Financial Exchange Bill Presentment, Jun. 12, 1997, 1997 CheckFree Corp., Intuit Inc., Microsoft Corp, pp. 312-356.

Hush Encryption Engine White Paper, Version 2.0, Jul. 2001.

Cryptography and Network Security Second Edition Stallings, William; Jul. 15, 1998 Prentice Hall.

* cited by examiner

|  | Access Portal | | Biller A | Biller B | Biller C |
|---|---|---|---|---|---|
| User A | User Name: A' Password: PA | | Acct. # AA Name: A Address: ZA | Acct. # AB Name: A Address: ZA | Acct. # AC Name: A Address: ZA |
| User B | User Name: B' Password: PB | | Acct. # BA Name: B Address: ZB | Acct. # BB Name: B Address: ZB | Acct. # BC Name: B Address: ZB |
| User C | User Name: C' Password: PC | | Acct. # CA Name: C Address: ZC | Acct. # CB Name: C Address: ZC | Acct. # CC Name: C Address: ZC |

FIG. 2 (Prior Art)

ACCESSING INFORMATION ON A NETWORK USING AN EXTENDED NETWORK UNIVERSAL RESOURCE LOCATOR

CROSS REFERENCE TO RELATED APPLICATIONS

This application is a continuation of application Ser. No. 09/471,490, filed Dec. 23, 1999 entitled "Securing Electronic Transactions Over Public Networks (now U.S. Pat. No. 6,948,063), which is incorporated herein by reference.

TECHNICAL FIELD

The present invention relates generally to electronic commerce and more particularly to securing electronic transactions made over public networks such as the Internet.

BACKGROUND ART

The Internet has had a profound affect on various aspects of everyday commerce. More and more individuals are utilizing the Internet to electronically perform tasks which were previously performed in other ways. For example, electronic transactions are now commonplace on the Internet. Such transactions include electronic banking, electronic bill presentment, electronic bill payment and electronic purchasing.

As the use of the Internet for electronic commerce has developed, a model has emerged in which users often access other entities on the Internet through a trusted entity such as a financial institute. These entities through which access to other entities is made will hereinafter be referred to as "portals".

The portals are often supported by a service provider. The service provider, for example, may process electronic user requests, which are received by the portal, for information relating to a user's deposit account at a particular bank by electronically accessing information maintained by the applicable bank and processing that information so that it can be presented to the requesting user in a user friendly form.

Similarly, the service provider may also be the entity which responds to user requests received by the portal for billing information. For example, the service provider may receive summary bill information from numerous billers for numerous users and process this information such that the appropriate information can be presented in a user friendly manner in response to a request for bill information submitted by the user to the portal. However, if the user desires more detailed billing information, it is often preferable for the detailed bill information to be provided to the requesting user directly by the biller rather than by the service provider through the access portal.

Security of network communications relates to various aspects of protection. These include (i) secrecy, i.e. can someone other than the intended party view the data in transit?, (ii) immutability, i.e. how can one be assured that someone has not altered the data in transit?, (iii) authentication, i.e. how can one ensure that each party in the conversation, e.g. session, is who it says it is?, (iv) authorization, i.e. is the authenticated party allowed to do what it is requesting to do?, and (v) non-repudiation, i.e. can a party repudiate its involvement, e.g. its actions?.

Secrecy is generally provided by encrypting data. For example, encrypted HTML, i.e. HTML/HTTPS (SSL), is used to insure that unintended parties can not see the information as it travels across the network, e.g. the Internet. However, this does not prevent the various transit points, e.g. the service provider and the portal, from viewing data that travels over the network. Thus, for example, a URL to a payor's detailed bill information could be misappropriated at a transit point or from the payor's terminal, e.g. from the payor's browser history, and could then later be used to access the payor's detailed bill information.

Like secrecy, immutability is also generally provided by encrypting the data. Typically, due to the nature of the algorithms, encryption which provides good secrecy also provides good immutability. For example, HTML/HTTPS is used to insure immutability as the data bits are traveling across the network. That is, even if one were to improperly access data off a network router, or at a transit point, it would be virtually impossible to read the misappropriated data; however, the data still could be altered. Thus, for example, an account number associated with the payor's detailed bill information could be misappropriated at a transit point and mangled. It this were to occur, the biller would have no way of confirming that a payor account number, originally sent by the portal to the payor and then sent by the payor to the biller with the request for detailed bill information, has not been misappropriated and mangled before being received by the biller.

FIG. 1 is a somewhat simplified network diagram indicating various channels which may be established between network entities to provide electronic bill presentment services. As shown in FIG. 1, the network includes users A-C which are represented on a network by network devices 105A-105C. The network devices 105A-105C could, for example be any device capable of communicating over the network, such as a personal computer, palm computer, set top box etc. Billers A-C are also represented on the network by network devices 110A-110C, typically although not necessarily high power workstations, mini-computers or mainframe computers, often referred to as servers. The network also includes an access portal 115 and a service provider 120.

Users A-C access services available on the network by establishing channels 125A-125C with the access portal 115. The access portal is linked to the service provider 120 by channel 130. The service provider in turn is linked to the billers A-C by channels 135A-135C.

For example, the channels 125A-125C may be Internet channels which are established through an Internet access provider, such as America Online (not shown), using a browser, such as browsers currently available from Microsoft Corporation and Netscape Corporation. Accordingly, the communications between the user devices 105A-105C and the access portal 115 are typically encrypted HTML communication, i.e. HTML/HTTPS.

Communications between the access portal 115 and the service provider 120 typically will follow a protocol such as IFX, or OFX etc., which may better ensure the security of the communications whether the link is via a private network or a public network such as the Internet. Similarly, communications between the service provider 120 and the biller network devices 110A-110C will also typically follow an established protocol and be transmitted via channels 135A-135C which are provided on a private or public network.

If detailed bill information is desired by a user, further communications channels must be established between the requesting user and the appropriate biller. Accordingly, if user A desires detailed billing information relating to the bills of billers A-C communication links 140A-140C will be required as shown in FIG. 1. These communication links will typically be established via the Internet using an Internet browser and accordingly carry encrypted HTML communications. It will be recognized that channels similar to channels 140A-140C could be established between user devices 105B and 105C and biller devices 110A-110C to communicate detailed bill information from billers A-C to users B and C.

Each of the users A-C will typically be known to different network entities by different identifiers. For example, as shown in FIG. 2, each of the users A-C are known to each of the billers A-C by the user's name, e.g. A, B or C, the applicable user's address, e.g. ZA, ZB or ZC, and a unique account number, e.g. AA-CC which each biller associates with each user.

The access portal 115 will typically know each of the users A-C by a unique user name, e.g. A'-C' and a unique password, e.g. PA-PC. Alternatively, users may be known to the access portal 115 by a digital certificate, e.g. a digital signature, although this is relatively uncommon today.

The user name and password or digital certificate are often referred to as the user's credentials and are used by the access portal 115 to authenticate the user. The access portal 115 then vouches for authenticated users to other network entities. Should a particular user also have a transactional relationship with the access portal, for example if the access portal is a user's financial institute or stock brokerage firm, the user will also typically be known to the access portal by additional information similar to that shown in the biller columns of FIG. 2.

FIG. 3A depicts typical communications between and functions of various network entities in providing bill summary information to a requesting user. As shown, network device 105A, representing user A, implements a browser 305, typically stored on a local memory, to communicate its credentials via an encrypted HTML communication over the Internet channel 125A to the access portal 115. The access portal 115 processes the credentials to authenticate user A, as indicated by reference numeral 310. Portal 115 then provides a response, as represented by the communicated authentication message, to network device 105A either granting or denying access based on whether or not user A has been successfully authenticated by the processing of the credentials. If access is granted, user A, operating network device 105A, may now request bill summary information from the access portal 115 via the channel 125A.

Having authenticated user A, the access portal 115 transmits the request for bill summary information via a protocol over channel 130 to the service provider 120. In response to the request, the service provider 120 retrieves the bill summary information and applicable universal resource locators (URL's) 315 from, for example, a local memory. The bill summary information and URL's 315 are typically provided by the billers via protocol or batch transmissions over channels 135A-135C to the server 120 off-line, i.e. in non-real time, with respect to the user request for the bill summary information.

The bill summary information and URL's are provided over channel 130 from the service provider 120 to the access portal 115. The access portal 115 then directs the bill summary and associated URL's to the user Internet device 105A via the Internet channel 125A in an encrypted HTML message.

Accordingly, bill summary information and URL's flow via a protocol from the biller to the service provider and from the service provider to the access portal. The bill summary information is only provided by the access portal to the user after authentication of the user. Further, the bill summary information and associated URL's for a particular user are provided to the access portal for transmission to the requesting user only if the access portal can vouch for the user to the service provider based upon its authentication of the user.

The URL's associated with the bill summary information represent the addresses to the bill detail information stored on the network 100 for the transmitted summarized bill information. The bill detail information of billers A-C may be respectively stored, for example, on the memories 320A-320C. It should be recognized that, as described in the above-referenced related applications, the bill detail information could also or alternatively be stored at the service provider 120 or at another network site controlled, for example, by a bill aggregator. In any event, the URL's to the bill detail information are passed, along with the bill summary information, from the service provider 120 to the access portal 115 and from there to the user network device 105A. Typically each URL is embedded as a hyperlink in the applicable bill summary information presentation which will appear on a display included in the network device 105A.

A typical display is shown in FIG. 4. FIG. 4 depicts a display 400 of network device 105A which is used to present the requested bill summary information for user A. As shown, the presentation includes the names of billers A-C in display areas 405A-405C, the applicable bill amounts XA-XC billed by each of the billers A-C to user A in display areas 410A-410C, and a view bill request area associated with each of the billers A-C in display areas 415A-415C which can be clicked on using a mouse or other input device to activate the applicable hyperlink URL HA-HC, identified with reference numerals 420A-420C, to establish a link to the bill detail information underlying the bill summary information being presented. The applicable bill may also be paid directly from the bill summary presentation by clicking on the appropriate pay bill area 425A-425C.

As shown in FIG. 3B, by clicking on view bill area 415A and thereby activating the URL HA identified with reference numeral 420A in FIG. 4, the user network device 105A is linked via an encrypted HTML Internet channel 140A to the biller address, i.e. URL address HA, at which the detailed bill information of the biller A for user A is stored. The detailed bill information is then provided via the channel 140A to the user A network device 105A without either the request or the provided detailed bill information flowing through the service provider 120 or access portal 115.

It should be understood that, if the bill detail information were stored at the service provider 120 or an aggregator (not shown), the hyperlink would link directly to an address at the aggregator or service provider network site at which the requested detailed bill information is maintained. In any event, the access portal 115 does not vouch for user A to biller A, the aggregator, or the service provider 120 in connection with the bill detail request and the bill detail information is communicated to the user A from biller A, the aggregator or the service provider 120 without flowing through the access portal 115.

This lack of authentication by the access portal 115 in connection with the bill detail request from user A is sometimes referred to as "the problem of transitive authentication". To address this problem it has been proposed to implement an OFX protocol (i.e. Open Financial Exchange Specification 1.51 dated Nov. 23, 1995, www.OFX.net) such that the creator of the bill detail information, e.g. the biller, aggregator or service provider etc., create a somewhat extended URL.

As shown in FIG. 5A, in the proposed implementation of OFX 1.51, the somewhat extended URL 500 includes a network address 505 for the bill detail information, a bill identification (ID) 510 which identifies the particular bill being requested, and a user account number 515 which the biller associates with the applicable user. As indicated in FIG. 5A, the bill ID and user account number are typically encrypted, but may instead be hashed.

FIG. 5B presents a more realistic depiction of the somewhat extended URL 500 of FIG. 5A for a typical Internet address prior to encrypting or hashing the bill ID 510 and user account number 515. More particularly, FIG. 5B depicts the somewhat extended URL 500' with the network address 505', the bill ID 510' and the account number 515'.

The somewhat extended URL 500' provides the recipient of the request for detailed bill information, e.g. the biller, bill aggregator or service provider, with sufficient information to identify the particular bill based on the bill ID 510' and to verify the user account number based on account number 515', prior to allowing access to the detailed bill information stored at address 505'. However, the recipient has no way of verifying that the request has actually been made by the appropriate user, for example user A as shown in FIG. 3B. Furthermore, there is no way for the recipient to know whether the somewhat extended URL originally transmitted by the access portal 115 has been tampered with and, for example, includes modified e.g. mangled, address, bill ID and/or user account number information.

For example, it is impossible for the recipient to know if the somewhat extended URL has been improperly copied from the user's browser either by operation of the user's network device on which the somewhat extended URL may be stored, by hacking into the information stored on the user's network device by the browser, or by installing coding, such as a JAVA applet, which automatically transmits information stored on the user's network device without user's knowledge to a network device under the control of others. It is also impossible for the recipient to know if the encrypted data has been altered. Hence, the proposed implementation of OFX 1.51 cannot ensure the integrity of the somewhat extended URL or serve as an aid in authenticating to the recipient that the requester is who he/she says he/she is.

Accordingly, a need remains for a technique to address the problem of transitive authentication.

OBJECTIVES OF THE INVENTION

Accordingly, it is an objective of the present invention to address the problem of transitive authentication.

It is another objective of the present invention to provide a technique which protects the integrity of the URL's which are used to access private information over a network.

It is also an objective of the present invention to provide a technique which allows a request recipient to authenticate the requesting party.

Additional objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the invention a networked system for accessing information includes a first network station, such as a network server or other network device, which represents a first network entity, for example a biller. A second network station, which could be another network server or some other network device, represents a second network entity, such as an access portal, and controls access to the network by a third network entity. The first station controls access to information, such as detailed bill or other information, stored on a network for the third network entity, such as a customer of the biller. The first station encrypts a first component message, sometimes simply referred to as a first component of an aggregate message, with a first crypto-key associated with the first network entity, e.g. the biller.

The first crypto-key could be a symmetric crypto-key which is known only to the first network entity. Alternatively, the first crypto-key could be a non-symmetric crypto-key, such as a public crypto-key of a joint private-public crypto-key pair associated with the first network entity. In any event, beneficially the first network station encrypts the first component message off-line, i.e. in non-real time. That is, preferable the first network station encrypts the first component message at a time other than the time of a request, such as a request for bill summary information, which will be responded to by transmitting the encrypted first component message. The first component message preferably includes identity information associated with the third network entity, and integrity information which corresponds to the identity information. The identity information advantageously includes an identification of information stored on the network, such as a bill ID and/or an account number. The integrity information could, for example, include a hash of the identity information. In a typical implementation, the first network station combines the encrypted first component message with a network address for the stored information.

The integrity information provides enhanced immutability, by ensuring that the first network entity can verify that a returned first component message has not been mangled or otherwise altered. For example, if the first component message includes a bill ID and payor account number which is returned to the biller by the payor with the request for detailed bill information, the biller can use the integrity information to verify that the returned bill ID and account information are the same bill ID and account number included in the first component message.

The second network station encrypts a second component message with a second crypto-key and combines the encrypted first and the encrypted second component messages. The combined messages are then transmitted over the network, which could for example be the Internet. It would be recognized by those skilled in the art that the second crypto-key could, if desired, also be applied to the encrypted first component message at the time of encrypting the second component message.

The second crypto-key could be a non-symmetric crypto-key. The non-symmetric crypto key might, for example, be a private crypto-key of a joint private-public crypto-key pair associated with the second network entity. Alternatively, the second crypto-key could be a symmetric crypto-key known also to the first network entity. In any event, preferably the second network station encrypts the second component message and combines the encrypted first and the encrypted second component messages on-line, i.e. in real time. That is, the second network station beneficially encrypts the second component message and combines it with the encrypted first component message at the time of a request, e.g. a bill summary request, which will be responded to by transmitting the combine component messages.

The second component message preferably includes voucher information which indicates that the second network entity has authenticated the third network entity. The voucher information enhances authentication by allowing the second network entity to vouch for the third network entity to the first network entity. The voucher information can be used to authenticate who the third network entity is and, if desired, the third network entity's relationship with the second network entity. This allows, for example, a portal to confirm to a biller that the payor requesting detailed bill information is who he/she says he/she is and that the payor has a relationship with the portal.

Advantageously, the second component message also includes a timestamp corresponding to a time at which the combined messages are transmitted by the second network station. The timestamp enhances secrecy by preventing a misappropriated combined messages from later, i.e. beyond some designated time period after the time indicated by the timestamp, being used to access the information, such as detailed bill information. The timestamp also enhances non-repudiation, since it can be used by the first network entity to confirm that the combined messages were recently transmitted by the second network entity to the third network entity. Thus, for example, the timestamp can be used by a biller to confirm that a request for detailed bill information was received promptly after the associated bill summary information had been provided by a portal to the applicable payor.

A third network station, such as a personal computer or other network device, represents the third network entity and receives the transmitted combined messages, or what might also be referred to as an aggregate message formed of combined component messages. The third station further transmits the received combined messages over the network in order to obtain access to the stored information. In this regard, the first network station receives the further transmitted combined messages, and decrypts the encrypted first and the encrypted second component messages contained therein. The first network station then controls access by the third network station to the stored information based on the decrypted first and second component messages. For example, if the first station is unable to successfully decrypt either of the component messages, access would typically be denied. If the decrypted first component message is associated with an entity different than the entity being vouched for in the second component message access would also be denied. If the timestamp indicates that a threshold time period has expired since the second network station transmitted the combined message, access may be denied.

In accordance with other aspects of the invention, a fourth network station, such as another server or network device, represents a fourth network entity, for example a service provider. The fourth network device encrypts a third component message with a third crypto-key and initially combines the encrypted first and third component messages. The fourth network station then transmits the initially combined messages over the network.

The third crypto-key could be a non-symmetric crypto-key, which, for example, might be a private crypto-key of a joint private-public crypto-key pair associated with the fourth network entity. Alternatively, the third crypto-key could be a symmetric crypto-key known also to the first network entity. In any event, preferably the fourth network station encrypts the third component message and combines the encrypted first and the encrypted third component messages on-line, i.e. in real time. That is, the fourth network station advantageously encrypts the third component message and combines it with the first component message at the time of a request, e.g. a bill summary request, which will be responded to by transmitting the combined messages. The public crypto-keys associated with the second and fourth network entities, could be distributed by either one of these entities, or by each of these entities, or by some other network entity.

The third component message preferably includes relationship information which indicates that the identity and integrity information was received by the fourth network entity from the first network entity and transmitted by the fourth network entity to the second network entity.

The second network station receives the transmitted initially combined messages, and combines the encrypted first and the encrypted third component messages contained therein with the encrypted second component message to create the above described combined messages. Hence, the first network station can decrypt the encrypted third component message and also use this message to control access by the third network station to the stored information. For example, if the information in the third component message is inconsistent with that in the second component message, access will be denied.

It should be understood that as used herein, the network could be made up of multiple sub-networks, some of which could be public while others are private. For example, in a bill presentment and payment implementation, the first and third network stations and the second and third network stations might communicate over the Internet, while the fourth network station communicates with the first network station via the Internet or some other network, and with the second network station over the Internet or some still further network.

In accordance with other aspects of the invention, an electronic message has a first component created by a first network entity and encrypted with a first crypto-key, associated with the first network entity, such that the encrypted first component can be decrypted by only the first entity. The message also includes a second component created by a second network entity, and encrypted with a second crypto-key, such that the encrypted second component can also be decrypted by the first network entity. In some implementations, the message may advantageously additionally include a third component created by a third network entity and encrypted with a third crypto-key, associated with the third network entity, such that the encrypted third component can be decrypted by the first network entity.

According to further aspects of the invention an electronic message, includes a first component encrypted with only a symmetric crypto-key and a second component, different than the first component, encrypted with only a non-symmetric crypto-key. In certain implementations the symmetric crypto-key is associated with a first entity, and may only be known to the first entity, while the non-symmetric crypto-key is associated with a second entity. The non-symmetric crypto-key may beneficially be a private crypto-key of a joint private-public crypto-key pair associated with the second entity.

In accordance with still other aspects of the invention, an extended network universal resource locator (URL) which is particularly suitable for Internet commerce includes a first component having a network address at which stored information can be accessed on a network. The extended URL also includes a second component having identity information associated with a first network entity and an integrity value corresponding to the identity information. The second component is encrypted with a first crypto-key of a second network entity. The extended URL additionally includes a third component having relationship information indicating that the encrypted second component was received by a third network entity from the second network entity and transmitted by the third network entity to a fourth network entity. The third component is encrypted with a second crypto-key of the third network entity. The extended URL further includes a fourth component having voucher information indicating that the fourth network entity has authenticated the first network entity and that transmission of the extended URL by the fourth network entity to the first network entity occurred at a particular time. The fourth component is encrypted with a third crypto-key of the fourth network entity.

For example, if the extended universal resource locator is implemented in connection with electronic bill presentment via the Internet, the stored information could be detailed bill information. The network address would be an Internet URL. The identity information could include an identification of the stored information, e.g. detailed bill information and an account number associated with the first network entity. Preferably, the integrity value is a hash of the identity information and the transmission time information is a timestamp.

In such an implementation, the second network entity might be a biller or other entity which controls access to the stored information, such as the detailed bill information. The third network entity, might be a service provider, such as CheckFree Corporation, which controls access to other information, such a summary bill information, which is transmitted with the extended network universal resource locator by the fourth network entity to the first network entity, which might be the customer. The fourth network entity might an access portal which controls access by the first network entity to other entities on the network.

BRIEF DESCRIPTION OF DRAWINGS

FIG. 2 depicts the user identification information conventionally available to the access portal and the billers of FIG. 1.

BEST MODE FOR CARRYING OUT THE INVENTION

Although the present invention will now be described in the context of bill presentment, it should be recognized that the invention has wide applicability and can be easily adapted for use in obtaining virtually any type of private information by a user directly from the custodian of that information. For example, the present invention may have significant application in web banking, web brokerage, web mortgaging, request for credit reports, etc. without requiring the user to sign-on with other than its access portal during the session, even though the user will access the information directly from an entity other that the access portal during the session.

Figure 1:
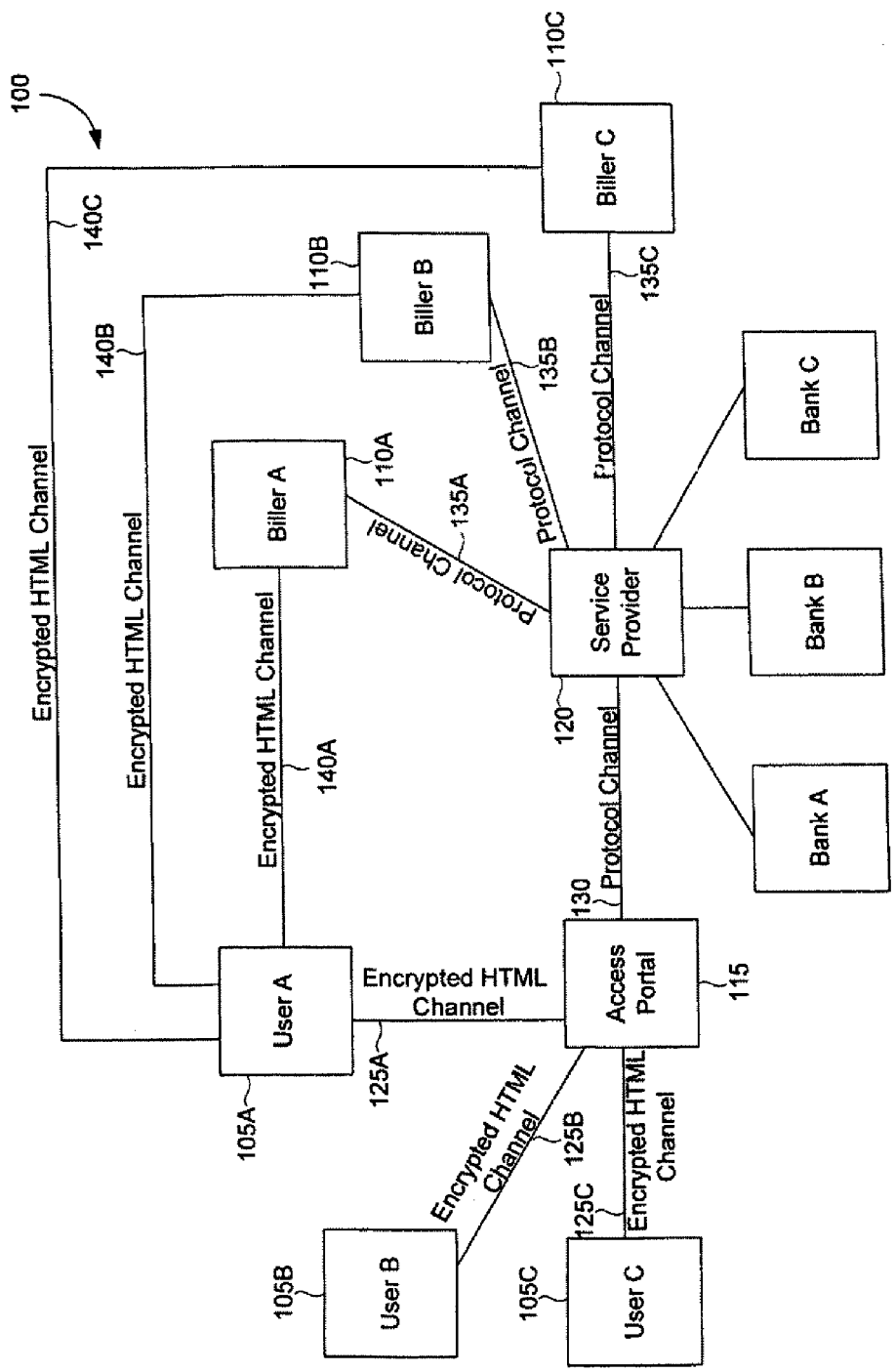
FIG. 1 depicts a conventional bill presentment network.
Figure 3:
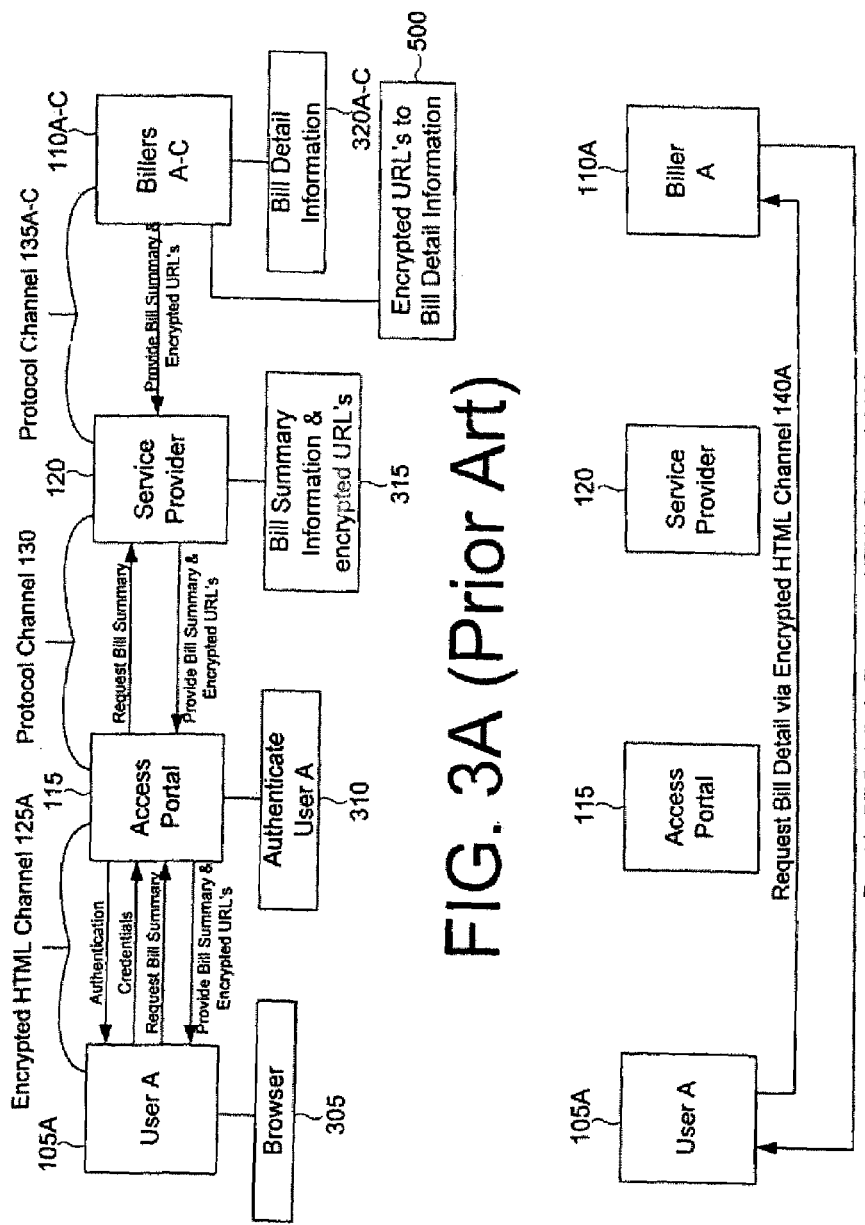
FIG. 3A depicts a typical message flows between a user, the access portal, the service provider and a biller to request and present bill summary information via the FIG. 1 network.
FIG. 3B depicts a typical message flows between and a user and a biller to request and present detailed bill information via the FIG. 1 network.
Figure 6:
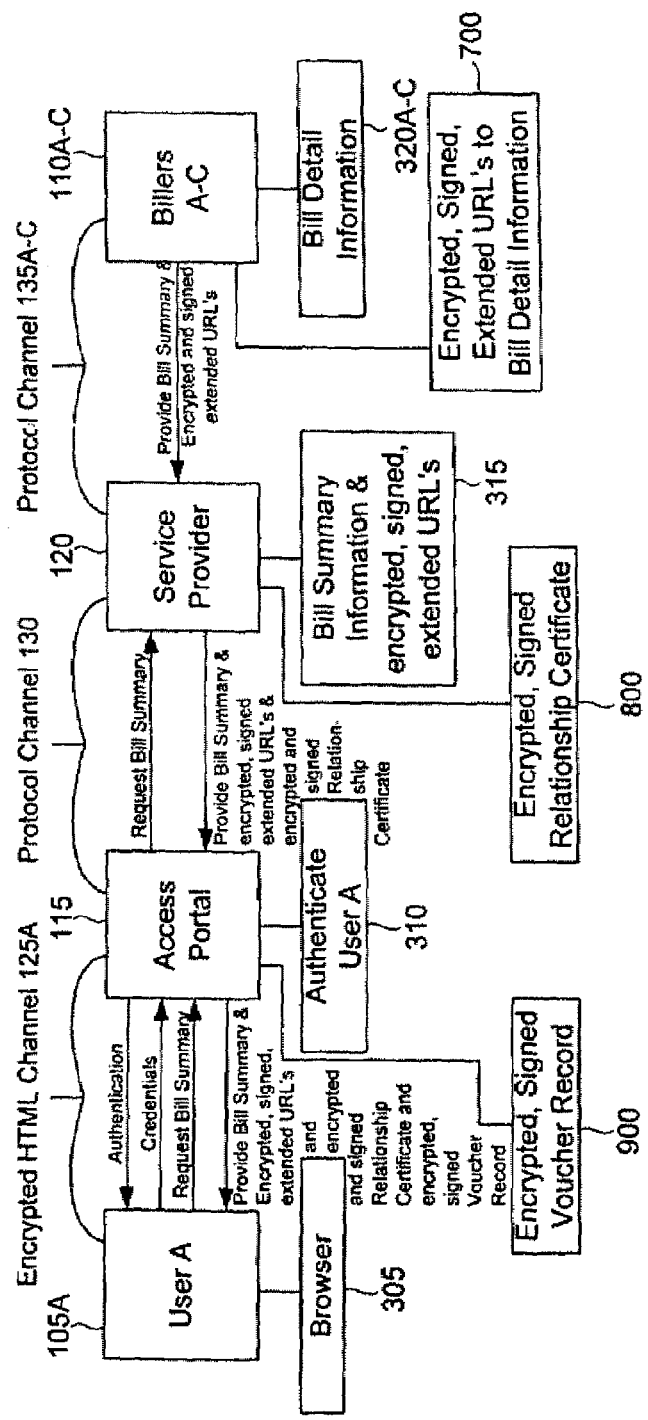
FIG. 6 depicts message flows between a user, the access portal, the service provider and a biller to request and present bill summary information via the FIG. 1 network in accordance with the present invention.

FIG. 6 depicts typical communications between and functions of various network entities in providing bill summary information to a requesting user with a collaboratively manufactured extended URL. As shown, and previously described with reference to FIG. 3A, network device 105A representing user A implements a browser 305 to communicate its credentials via an encrypted HTML communication over the Internet channel 125A to the access portal 115. The access portal 115 processes the credentials to authenticate user A as indicated by reference numeral 310, and provides a response, as represented by the communicated authentication message, to network device 105A either granting or denying access based on whether or not User A has been successfully authenticated by the processing of the credentials. If access is granted, user A, operating network device 105A, can now request bill summary information from the access portal 115 via the channel 125A.

Having authenticated user A, the access portal 115 transmits the request via a protocol over channel 130 to the service provider 120. As described above with reference to FIG. 5, in accordance with OFX 1.5 the URL 500 conventionally provided to the service provider 120 from the biller includes a network address (NA) for the bill detail information 505, a bill ID (BID) 510 which identifies a particular bill being requested and the account number (AN) 515 which the biller associates with the applicable user.

Figure 7:
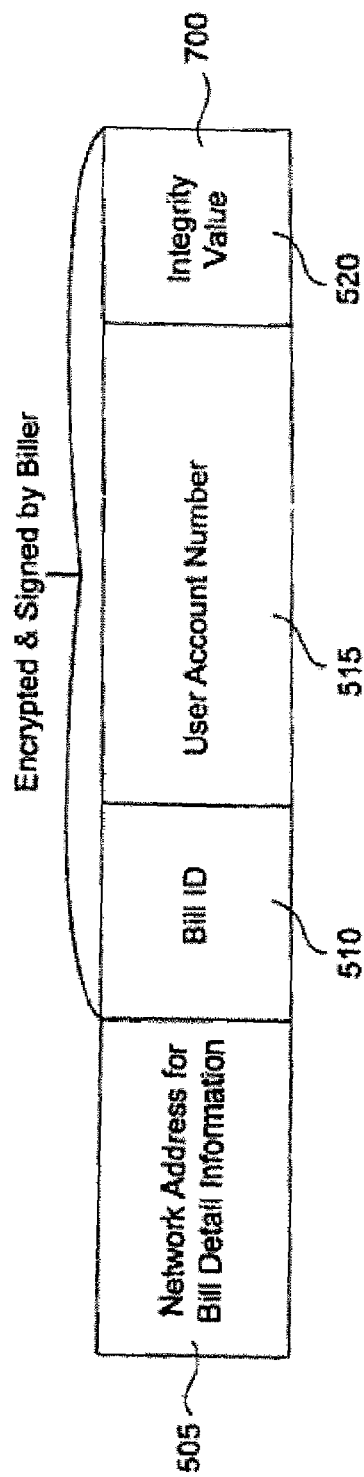
FIG. 7 depicts a portion of the collaboratively manufactured extended URL for use in requesting detailed bill information as shown in FIG. 6, in accordance with the present invention.

As shown in FIG. 7, in accordance with the present invention, the biller performs a hash computation, H, on the network address (NA) 505 for the bill detail information, the bill ID (BID) 510 which identifies a particular bill being requested and the account number (AN) 515 which the biller associates with the applicable user to form an integrity value (IV) 520 as follows:

$$H[NA+BID+AN] \quad (1)$$

The bill ID 510, user account number 515 and the integrity value 520 are then encrypted using a symmetric encryption key E to form an encrypted message as follows:

$$NA+E[BID+AN+IV] \quad (2)$$

It should be understood that, if desired, the encryption could be performed using the biller's non-symmetric public key of a joint private/public key pair, in lieu of the symmetric key E. In either case, the encryption and integrity value ensure the integrity of the base data, i.e. the bill ID 510 and the user account number 515, and the identification of the applicable user, in this case user A. The encrypted integrity value provides enhanced protection against altering of the information which will be returned to the biller by the payor with the request for detailed bill information. Hence, the biller can be confident that the exact bill ID, account information and user identification sent to the user is returned with user's the request for detailed bill information.

As also shown in FIG. 7, in accordance with the present invention, the encrypted bill ID 510, user account number 515 and integrity value 520 are also signed using a digital certificate S(1), preferably supplied by the service provider 120 but which could alternatively be supplied by a separate certificate authority, to form an encrypted, signed extended URL message 700 to the detailed bill information as follows:

$$NA+[E[BID+AN+IV]]S(1) \quad (3)$$

The bill summary information (BSI) and the encrypted, signed extended URL message 700 are provided by each biller A-C, preferably via a secure protocol or batch communication over channels 135A-135C, to the service provider 120 in a message 315' as the following:

$$BSI+NA+[E[BID+AN+IV]]S(1) \quad (4)$$

Hence, responsive to the request from the access portal 115, the service provider 120 can retrieve, for example from a local memory, the applicable message(s) 315'.

Figure 8:
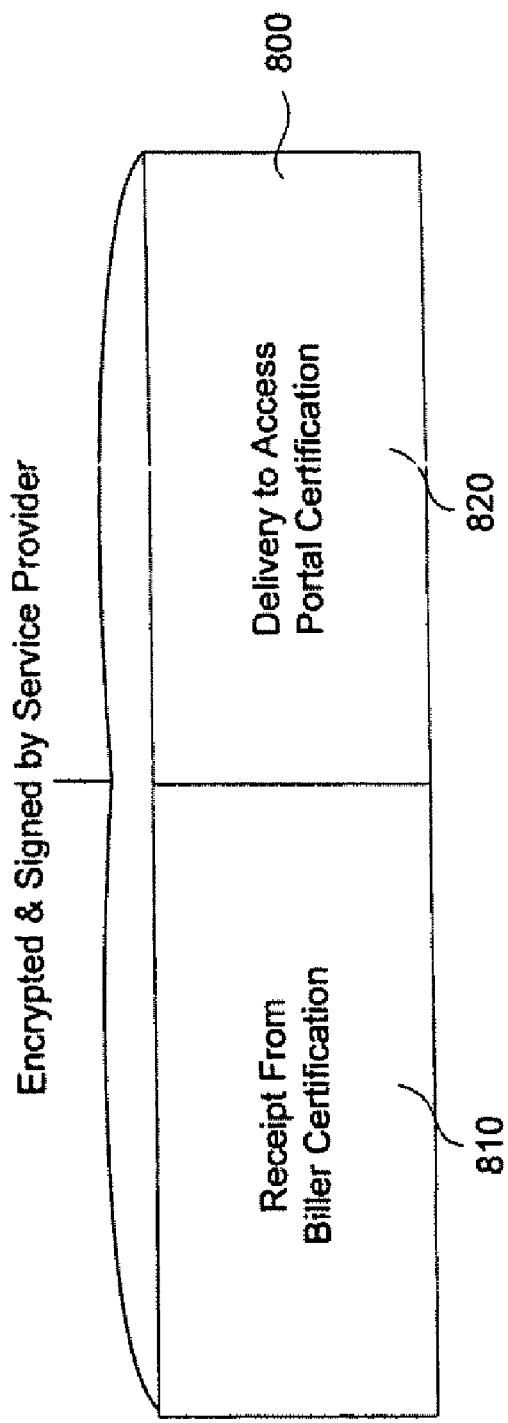
FIG. 8 depicts another portion of the collaboratively manufactured extended URL for use in requesting detailed bill information as shown in FIG. 6, in accordance with the present invention.

Continuing with the collaborative manufacture of the extended URL which will ultimately be returned to the user requesting the bill information, the service provider 120 creates, either prior to, i.e, off-line, or at the time of the request for the bill summary information, i.e. on-line, an encrypted, signed relationship certification (RC) 800, as shown in FIG. 8. The relationship certificate includes a certification 810 that the service provider 120 received each of the applicable encrypted, signed extended URL messages 700 from the applicable biller A-C and a certification 820 that the service provider 120 is delivering the applicable encrypted, signed extended URL messages 700 to the access portal 115. The access portal 115 may, for example under the OFX protocol, be identified to the service provider 120 in the request for bill summary information received by the service provider 120 from the access portal 115.

As shown in FIG. 8, the relationship certificate is encrypted, using the service provider's 120 non-symmetric private key, PKSP(2), of its joint private key PKSP (2)/public key PUBKSP(2) pair, and digitally signed using the service provider's 120 digital certificate S(2). Thus the encrypted, signed relationship certificate will take the form of a message such as the following:

$$[[RC]PKSP(2)]S(2) \quad (5)$$

The encrypted relationship certificate will ensure that the commercial parties, i.e. the service provider 120 and the access portal 115, are identified in the extended URL.

Figure 9:
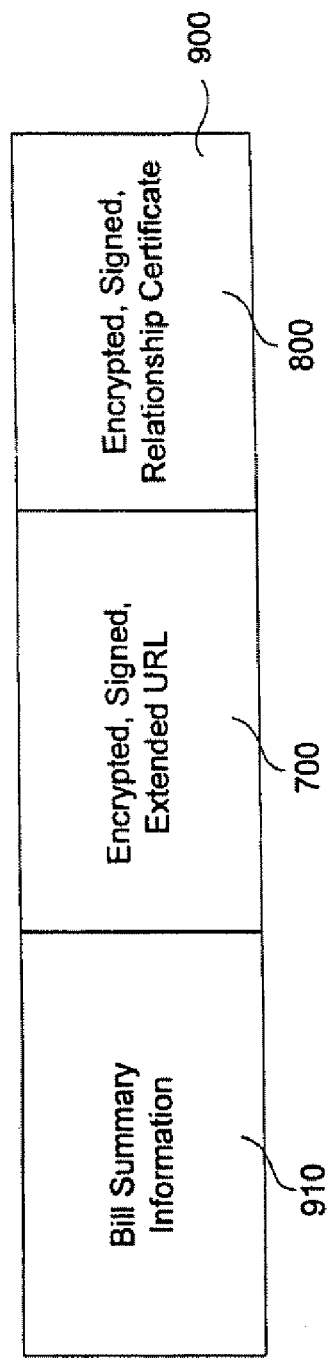
FIG. 9 depicts a combination of summary bill information and the portions of the collaboratively manufactured extended URL shown in FIGS. 7 and 8, in accordance with the present invention.

As shown in FIG. 9, the bill summary information 910 and a further extended URL message, including the encrypted, signed extended URL message 700 and the encrypted, signed relationship certificate 800, are transmitted over channel 130 from the service provider 120 to the access portal 115 in a further extended message 900 in the following form:

$$BSI+NA+[E[BID+AN+IV]]S(1)+[[RC]PKSP(2)]S(2) \quad (6)$$

It should be recognized that the message 900 may be created and stored by the service provider 120 prior to receiving a request for the bill summary information or created in response to the receipt of such a request.

After receipt of message 900, the access portal 115 may, if desired verify that message 900 is from the service provider 120 and intended for the access portal 115 by applying the public key PUBKSP(2) of service provider 120 to the encrypted relationship certificate as follows:

$$[[RC]PKSP(2)]PUBSP(2) \quad (7)$$

Figure 10:
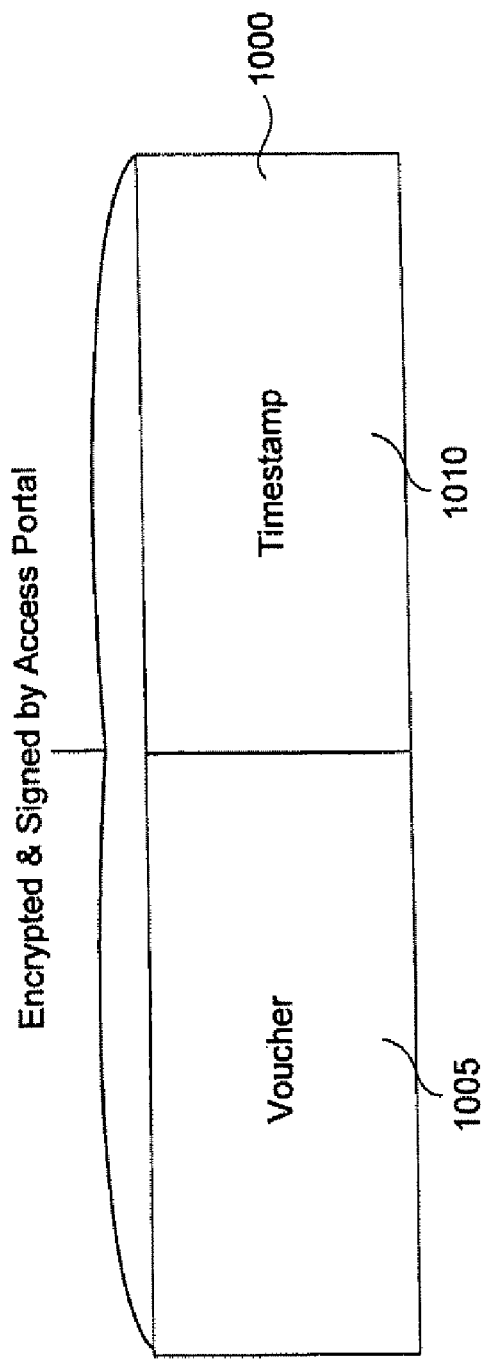
FIG. 10 depicts still another portion of the collaboratively manufactured extended URL for use in requesting detailed bill information as shown in FIG. 6, in accordance with the present invention.

The access portal 115 continues the collaborative manufacture of the still further extended URL which will ultimately be returned to the user requesting the bill information. In this regard, the access portal 115 creates a voucher (V) 1005, depicted in FIG. 10, which identifies the access portal 115 and indicates that the access portal 115 has authenticated the user, in this case user A.

The access portal 115 then encrypts, using the access portal's 115 non-symmetric private key, PKAP(3), of its joint private key PKAP(3)/public key PUBKAP(3) pair, and signs, using a digital certificate, S(3), provided by the service provider 120 or some other certificate authority, the voucher (V) 1005 and a time stamp (TS) 1010 to form an encrypted, signed voucher record (VR) 1000 as follows:

$$[[V+TS]PKAP(3)]S(3) \quad (8)$$

The encrypted, signed voucher will ensure that it can be verified that the applicable user is known to the access portal 115, and the encrypted, signed timestamp will ensure that the bill detail request has only a limited lifetime.

More particularly, the voucher enhances authentication. That is, the voucher, which will be transmitted by the portal to the user with the bill summary information and by the user to the biller with the request for detailed bill information as will be described further below, serves as the portal's confirmation to the biller that the payor is in fact who he/she says he/she is and that the payor has a relationship with the portal.

The timestamp enhances secrecy and non-repudiation by preventing the network address 505 in the collaboratively manufacture extended URL 1150 from being used to access the user's detailed bill information after a short timeout, i.e. threshold, period, e.g. 30 minutes from the transmission of the extended URL 1150 by the portal. Although not foolproof, since the timestamp prevents a misappropriated network address 505 from being used to access detailed bill information after a relatively short period of time, the likelihood that a request to access detailed bill information from some misappropriating party will be granted, is significantly reduced. Furthermore, because the timestamp evidences that the bill summary information associated with the now requested detailed bill information was recently, i.e. within the timeout period, transmitted to the user by the portal, it is more difficult for the user to repudiate its receipt of the bill summary information and/or of its request for access to the detailed bill information.

Figure 11:
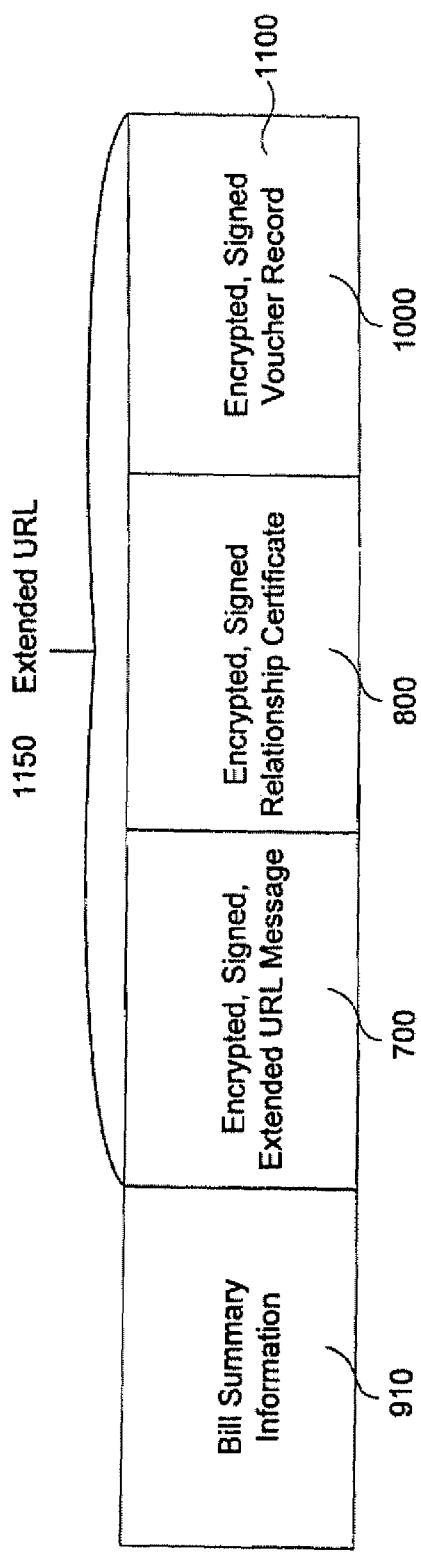
FIG. 11 depicts a combination of summary bill information and the collaboratively manufactured extended URL, in accordance with the present invention.

The bill summary information and the still further extended URL 1150, including the encrypted, signed extended URL message 700, the encrypted, signed relationship certification 800, and the encrypted, signed voucher record 1000, are transmitted as the following message, depicted as message 1100 in FIG. 11, over encrypted html channel 130, from the access portal 115 to the requesting user, here user A being represented by network device 105A:

$$BSI+NA+[E[BID+AN+IV]]S(1)+[[RC]PKSP(2)]S(2)+ [[VR]PKAP(3)]S(3) \quad (9)$$

It will be recognized that encrypted html channels are often referred to as https or secure socket layer (SSL) channels.

Accordingly, the access portal 115 directs to the user network device 105A, via the channel 125A in an encrypted HTML message, a message 1100 having a very rich, collaboratively manufactured extended URL 1150 including:

(i) the encrypted, signed extended URL message 700 generated by the biller with the unencrypted network address, NA, 505 at which the bill detail information is stored and the encrypted, signed bill identification, BID, 510, user account number, AN, 515, and integrity value, IV, 520, (ii) the encrypted, signed relationship certification, RC, 800 generated by the service provider 120 which certifies that the encrypted signed extended URL message 700 was received from the applicable biller A-C and delivered to the applicable access portal 115, and (iii) the encrypted, signed voucher record, VR, 1000 generated by the access portal with the voucher 1005 certifying that the access portal 115 has provided the collaboratively manufactured extended message 1100 to the applicable user, in this case user A, and the time stamp 1010.

Figure 4:
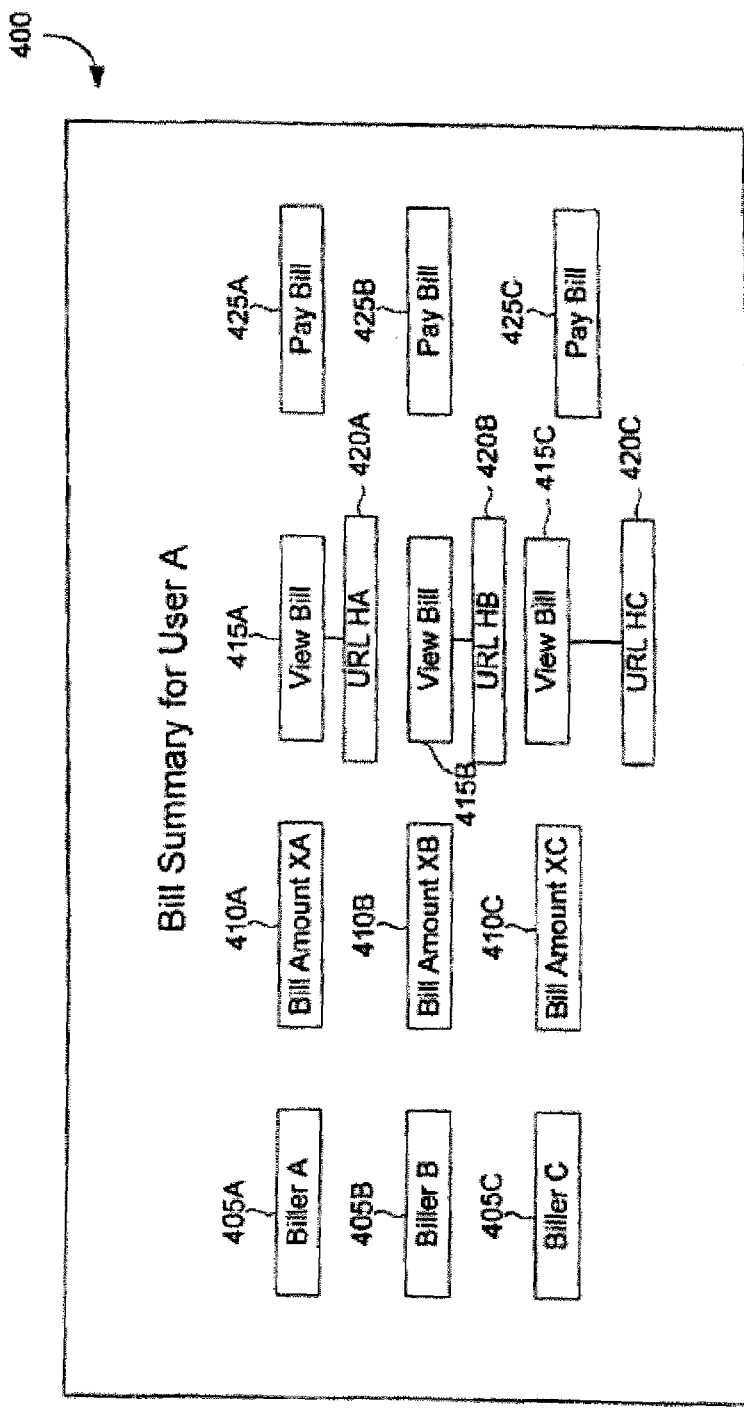
FIG. 4 depicts a conventional presentation of bill summary information to the user shown in FIG. 3A.
Figure 5A:
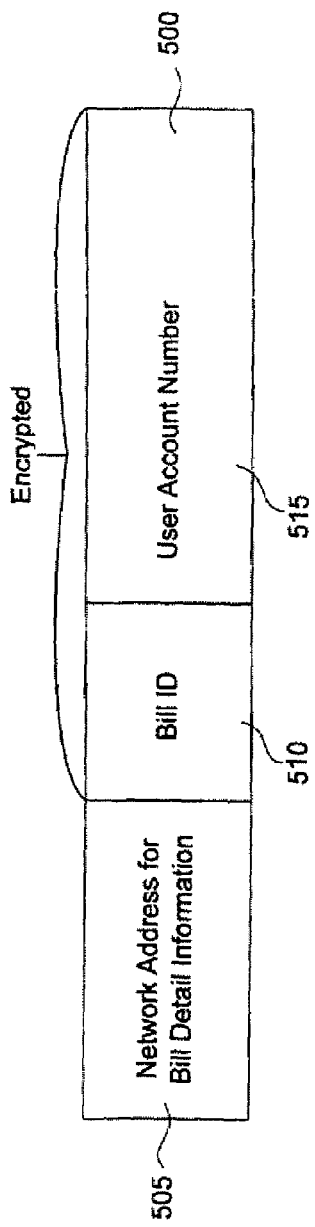
FIG. 5A depicts a conventional URL for use by the user shown in FIG. 3B in requesting detailed bill information.
Figure 5B:
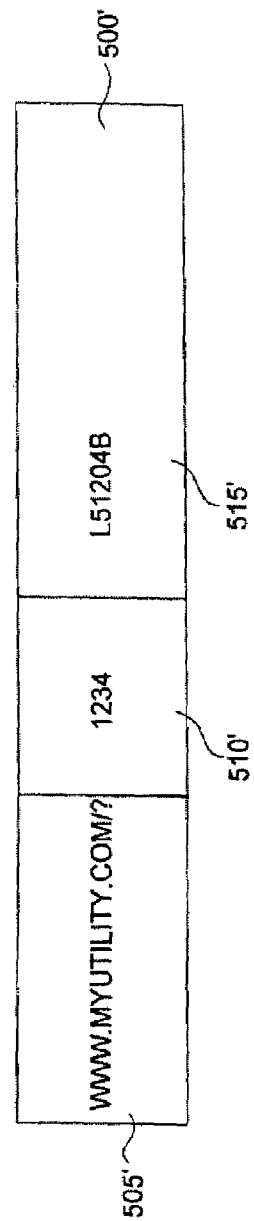
FIG. 5B is a more realistic depiction of the URL of FIG. 5A.

With the collaboratively manufactured extended URL 1150 of message 1100, as shown in FIG. 11, substituted for the URL 500 shown in FIG. 5, the display 400 of Internet device 105A presents, as shown in FIG. 4, the requested bill summary for user A. The presented bill summary includes a view bill request area associated with each of the billers A-C in display areas 415A-C. The view bill request area can be clicked on using a mouse or other input device to activate the applicable collaboratively manufactured extended URL 1150 forwarded in message 1100 to hyperlink to the bill detail information underlying the applicable bill summary information being presented, as previously described with reference to FIG. 3B. Thus, by clicking on view bill area 415A and thereby activating the collaboratively manufactured extended URL 1150 to the bill detail for biller A's bill, the user network device 105A is linked via an encrypted HTML channel 140A to the address at which the detailed bill information of the biller A for user A is stored as described with reference to FIG. 3B.

However, before the detailed bill information is provided via the channel 140A to the user A network device 105A, the biller checks the signature S(1) on the encrypted bill ID 510, user account number 515 and integrity value 520, and decrypts, using the corresponding symmetric decryption key D or the billers non-symmetric private key, as applicable, the bill ID 510, user account number 515 and integrity value 520 as follows:

$$D[BID+AN+IV] \quad (10)$$

The biller verifies the decrypted bill ID 510 and user account number 515 and, using the integrity value 520, also verifies that this information was the same information which it originally forwarded to the service provider 120.

Further, the biller checks the signature and then decrypts the encrypted relationship certificate using the public key, PUBKSP(2), of the service provider 120 as follows:

$$[[RC]PKSP(2)]PUBKSP(2) \quad (11)$$

The biller, using the relationship certificate, verifies that the service provider 120 received the bill ID 510, user account number 515 and integrity value 520 from the applicable biller and forwarded this information to the access portal 115.

Further still, the biller checks the signature and then decrypts the encrypted voucher record using the public key, PUBKAP(3) of the access portal 115 as follows:

$$[[VR]PKAP(3)]PUBKAP(3) \quad (12)$$

The biller, using the voucher record, verifies that the access portal 115 identified in the relationship statement of the service provider 120 vouches for the applicable user, and that, based on the time stamp, the time period within which the request for detailed bill information has been received is within a designated threshold, preferably two to five minutes.

Hence, not only is bill summary information transmitted via a secure protocol from the biller to the service provider and from the service provider to the access portal, but the bill summary information is not transmitted until after the applicable user is authenticated by the access portal. Further, the bill summary information for a particular user is provided to the access portal for transmission to the requesting user only if the access portal 115 can vouch for the user to the service provider 120 based upon its authentication of the user. Moreover, the collaboratively manufactured extended URL 1150 provides the request recipient, e.g. the biller, bill aggregator or service provider etc., information necessary to identify the particular bill and verify the user account number prior to allowing access to the detailed bill information.

Additionally, using the above described technique, the recipient now has a way of verifying that the request has actually been made by the appropriate user, for example user A as shown in FIG. 6. More particularly, the collaboratively manufactured extended URL 1150 provides the recipient with the ability to verify that the information originally transmitted by the access portal has not been tampered with and hence, reflects the correct network address, bill ID and user account number information. Further, the collaboratively manufactured extended URL 1150 makes it possible for the recipient to determine if the information has been improperly copied from user A's browser. Hence, by collaborative manufacture the integrity of the information and authenticity of the requesting party can be ensured.

As described above, the present invention addresses the problem of transitive authentication. Further, the present invention provides a technique which protects the integrity of the URL's which are used to access private information over a network. Additionally, the present invention provides a technique which allows a URL to be utilized by a request recipient to authenticate the requesting party.

It will also be recognized by those skilled in the art that, while the invention has been described above in terms of one or more preferred embodiments, it is not limited thereto.

Various features and aspects of the above described invention may be used individually or jointly. Further, although the invention has been described in the context of its implementation in a particular environment and for particular purposes, e.g. creating extended URL's, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A method for facilitating access to information on a network, comprising:
    generating an extended network universal resource locator having (i) a network address at which stored information can be accessed on a network, (ii) identity information associated with a first network entity and an integrity value corresponding to the identity information, the identity information and the integrity value being encrypted with a first crypto-key of a second network entity, and (iii) voucher information indicating that a third network entity has authenticated the first network entity and that transmission of the extended network universal resource locator by the third network entity to the first network entity occurred at a particular time, the voucher information being encrypted with a second crypto-key of the third network entity; and
    transmitting the extended network universal resource locator via the network to facilitate access, by the first network entity, to the information stored at the network address; wherein the extended network universal resource locator is generated to also have relationship information indicating that the encrypted identity information and integrity value were received by a fourth network entity from the second network entity and transmitted by the fourth network entity to the third network entity, the relationship information being encrypted with a third crypto-key of the fourth network entity.

2. The method according to claim 1, wherein:
    the first crypto-key is a symmetric crypto-key known only to the second network entity;
    the second crypto-key is a first non-symmetric crypto-key associated with the third network entity; and
    the third crypto-key is a second non-symmetric crypto-key associated with the fourth network entity.

3. The method according to claim 2, wherein:
    the first non-symmetric crypto-key is one of a private crypto-key or a public crypto-key of a joint private-public crypto-key pair associated with the third network entity; and
    the second non-symmetric crypto-key is one of a private crypto-key or a public crypto-key of a joint private-public crypto-key pair associated with the fourth network entity.

4. The method according to claim 1, wherein:
    the stored information is detailed bill information;
    the network address is an Internet URL;
    the identity information includes an identification of the stored information and an account number associated with the first network entity;
    the integrity value is a hash of the identity information; and
    the transmission time information is a timestamp.

5. The method according to claim 1, wherein:
    the second network entity controls access to the stored information;
    the fourth network entity controls access to other information which is transmitted with the extended network universal resource locator by the third network entity to the first network entity; and
    the third network entity controls access by the first network entity to other network entities.

6. The method according to claim 5, wherein:
    the stored information is detailed bill information associated with the first entity; and
    the other information is summary bill information associated with the first network entity.

7. An article of manufacture for facilitating access to information on a network, comprising:
    a memory; and
    computer programming stored on the memory, wherein the stored computer programming is configured to be readable from the memory and thereby cause a computer to operate so as to:
    generate an extended network universal resource locator having (i) a network address at which stored information can be accessed on a network, (ii) identity information associated with a first network entity and an integrity value corresponding to the identity information, the identity information and the integrity value being encrypted with a first crypto-key of a second network entity, and (iii) voucher information indicating that a third network entity has authenticated the first network entity and that transmission of the extended network universal resource locator by the third network entity to the first network entity occurred at a particular time, the voucher information being encrypted with a second crypto-key of the third network entity; and
    transmit the extended network universal resource locator via the network to facilitate access, by the first network entity, to the information stored at the network address; wherein the extended network universal resource locator is generated to also have relationship information indicating that the encrypted identity information and integrity value were received by a fourth network entity from the second network entity and transmitted by the fourth network entity to the third network entity, the relationship information being encrypted with a third crypto-key of the fourth network entity.

8. The article of manufacture according to claim 7, wherein:
    the first crypto-key is a symmetric crypto-key known only to the second network entity;
    the second crypto-key is a first non-symmetric crypto-key associated with the third network entity; and
    the third crypto-key is a second non-symmetric crypto-key associated with the fourth network entity.

9. The article of manufacture according to claim 8, wherein:
    the first non-symmetric crypto-key is one of a private crypto-key or a public crypto-key of a joint private-public crypto-key pair associated with the third network entity; and
    the second non-symmetric crypto-key is one of a private crypto-key or a public crypto-key of a joint private-public crypto-key pair associated with the fourth network entity.

10. The article of manufacture according to claim 7, wherein:
- the stored information is detailed bill information; the network address is an Internet URL;
- the identity information includes an identification of the stored information and an account number associated with the first network entity;
- the integrity value is a hash of the identity information; and
- the transmission time information is a timestamp.

11. The article of manufacture according to claim 7, wherein:
- the second network entity controls access to the stored information;
- the fourth network entity controls access to other information which is transmitted with the extended network universal resource locator by the third network entity to the first network entity; and
- the third network entity controls access by the first network entity to other network entities.

12. The article of manufacture according to claim 11, wherein:
- the stored information is detailed bill information associated with the first network entity; and
- the other information is summary bill information associated with the first network entity.

* * * * *